Figure 1:
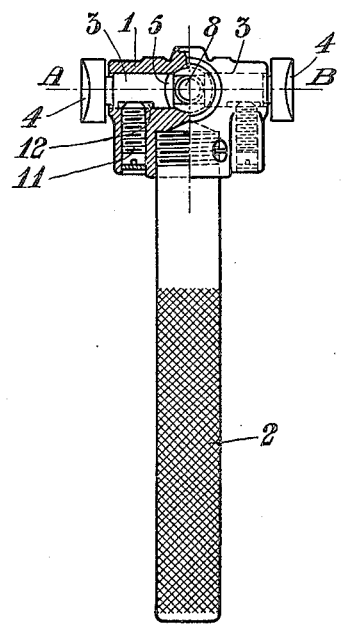

Dec. 26, 1922.

F. A. AVANDER ET AL.
GAUGE FOR MEASURING INTERNAL DIMENSIONS.
FILED AUG. 4, 1920.

1,439,989.

Inventors
Fritz Anders Avander
Nils Axel Hugo Nilsson
Claes Georg Ekman
By George Bayard Jones Atty.

Patented Dec. 26, 1922.

1,439,989

UNITED STATES PATENT OFFICE.

FRITZ ANDERS AVANDER, NILS AXEL HUGO NILSSON, AND CLAES GEORG EKMAN, OF ESKILSTUNA, SWEDEN, ASSIGNORS TO AKTIEBOLAGET C. E. JOHANSSON, OF ESKILSTUNA, SWEDEN, A MANUFACTURING COMPANY OF SWEDEN.

GAUGE FOR MEASURING INTERNAL DIMENSIONS.

Application filed August 4, 1920. Serial No. 401,189.

*To all whom it may concern:*

Be it known that we, FRITZ ANDERS AVANDER, NILS AXEL HUGO NILSSON, and CLAES GEORG EKMAN, subjects of the King of Sweden, and residents of Eskilstuna, in the Kingdom of Sweden, have invented a new and useful Improvement in Gauges for Measuring Internal Dimensions, of which the following is a specification.

The present invention relates to an improvement in gauges for measuring holes and internal dimensions generally of the type which are provided with two measuring studs placed in alignment and movable longitudinally in the frame of the gauge, the inner ends of said studs being cut off obliquely, and with a conical or wedge-shaped member projecting in between and engaging the said ends of said studs and movable at right angles to said studs for the purpose of moving the studs apart when their outer ends or measuring surfaces have become worn. In gauges of this kind as heretofore known the movement of the last mentioned member is generally effected by means of a screw threaded into the frame or handle of the gauge, which screw is adapted, when tightened for moving the studs apart, to push the conical or wedge-shaped member in between the studs. In order to render accurate measuring possible, however, the studs must fit very tightly in their guides in the frame, and therefore said studs and in a still higher degree, the wedge-shaped member will offer a rather considerable resistance to the said movement. This will result in the portion of the frame surrounding the studs being subjected to rather great stresses which may easily cause appreciable distortions of the frame whereby the gauge becomes useless for accurate measuring.

The purpose of the improvement forming the subject of the present invention is to avoid or at least to decrease as far as possible the said ruinous distortions in gauges as heretofore used. For this purpose the improvement consists in this that the movement of the conical or wedge-shaped member is effected by means of a screw screwed into the smaller end of said member and the head of which screw bears against a bearing surface in the portion of the frame surrounding the measuring studs, in such manner that when said screw is tightened for moving the stud apart it exerts a pulling action on the conical or wedge-shaped member. In this manner it is attained that the stressses caused by the tightening of the screw will be directly taken up by those portions of the frame against which the inner ends of the studs are forced by the wedge-shaped member during their moving apart, whereby also the distortion of the frame is reduced to a minimum.

Figure 2:
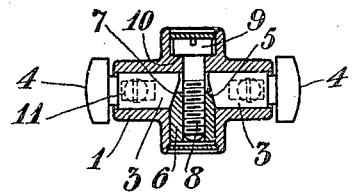

An embodiment of the invention is illustrated in the accompanying drawing, in which Fig. 1 shows a side view partly in section of a gauge according to the invention, and Fig. 2 shows a section on the line A—B in Fig. 1.

The frame 1 of the gauge is preferably made of cast iron and is provided in the usual manner with a handle 2, made for instance of a piece of tube. The two measuring studs 3 which are made of hardened steel, are placed in alignment in guides in the frame 1. The ends of the studs projecting outside the frame are provided with heads having measuring surfaces 4. The inner ends of the studs are provided with oblique or beveled faces 5 opposite one another. A cylindrical member 6 is movable in the frame 1 at right angles to the longitudinal direction of the studs, and is provided with two beveled faces 7 diametrically opposite one another, each of said faces bearing against a face 5 on the inner ends of the studs, in such manner that the member 6 acts as a wedge and moves the measuring studs apart when said member is moved in between the studs, in an upward direction in Fig. 2. According to the present invention the said movement of the member is effected by means of a screw 8 threaded into the smaller end of the member 6 into a central longitudinal screw-threaded hole. The screw 8 is provided with a head 9 bearing against a bearing surface 10 in the frame 1 so that when the screw is rotated it will not be moved longitudinally. When the screw is tightened it will thus pull the member 6 in between the measuring studs so as to force the same apart. The stresses caused thereby will be taken up, as will be easily understood from Fig. 2, directly by the portion of the frame in which the bearing surface 10 is located. The same portion of the frame, however, is simultaneously subjected to a pressure from the inner ends of the studs 3, which pressure is directed in the opposite direction, and in this manner the frame will be prevented from being appreciably distorted.

The desired adjustment of the studs 3 having been effected, each stud is secured in adjusted position by means of a set screw 11 the inner end of which is forced against a plane surface 12 on one side of the stud, as shown in Fig. 1. In this manner the studs are prevented from turning as well as from movement in the longitudinal direction. In order to prevent all undue adjustment of the measuring studs lead plugs may be applied in the recesses above the heads of the screws 8 and 11 and stamped, when it will be impossible to effect an adjustment of the measuring studs without destroying said lead plugs.

We claim:

In an internal gauge, the combination of a frame having a bearing surface, measuring studs arranged in alignment in said frame and movable therein towards and away from one another, the inner ends of said studs having beveled faces, a substantially wedge-shaped member projecting in between and engaging said ends of said studs and movable at right angles to the studs so as to move the same apart, said member having a screw-threaded hole, and a screw threaded into said hole in said member from its smallest end and provided with a head bearing against said bearing surface in the portion of the frame surrounding said studs, so that when said screw is turned in one direction for moving the studs apart it exerts a pulling action on said substantially wedge-shaped member.

FRITZ ANDERS AVANDER.
NILS AXEL HUGO NILSSON.
CLAES GEORG EKMAN.